United States Patent
Douriet et al.

(10) Patent No.: US 7,920,978 B2
(45) Date of Patent: *Apr. 5, 2011

(54) METHOD FOR DETECTING NOISE EVENTS IN SYSTEMS WITH TIME VARIABLE OPERATING POINTS

(75) Inventors: Daniel Douriet, Round Rock, TX (US); Anand Haridass, Austin, TX (US); Andreas Huber, Austin, TX (US); Colm B. O'Reilly, Austin, TX (US); Bao G. Truong, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/262,021

(22) Filed: Oct. 30, 2008

(65) Prior Publication Data

US 2009/0048794 A1 Feb. 19, 2009

Related U.S. Application Data

(63) Continuation of application No. 11/420,825, filed on May 30, 2006, now Pat. No. 7,467,050.

(51) Int. Cl.
G06F 1/26 (2006.01)
G06F 11/30 (2006.01)

(52) U.S. Cl. ......... 702/64; 702/69; 702/193; 713/340

(58) Field of Classification Search .......... 702/64, 702/69, 79, 193
See application file for complete search history.

(56) References Cited

U.S. PATENT DOCUMENTS

| | | |
|---|---|---|
| 4,810,101 A | 3/1989 | Kage et al. |
| 5,606,511 A | 2/1997 | Yach |
| 5,894,423 A | 4/1999 | Ling et al. |
| 6,191,647 B1 | 2/2001 | Tanaka et al. |
| 6,219,723 B1 | 4/2001 | Hetherington et al. |
| 6,472,856 B2 | 10/2002 | Groom et al. |
| 6,538,497 B2 | 3/2003 | Thomas et al. |
| 6,636,976 B1 | 10/2003 | Grochowski et al. |
| 6,675,301 B1 | 1/2004 | Kurosawa et al. |
| 6,721,903 B2 | 4/2004 | Yoshioka et al. |
| 6,799,070 B2 | 9/2004 | Wolfe et al. |
| 6,819,538 B2 * | 11/2004 | Blaauw et al. ............ 361/90 |
| 6,922,111 B2 | 7/2005 | Kurd et al. |
| 6,934,865 B2 | 8/2005 | Moritz et al. |
| 6,978,388 B1 | 12/2005 | Cornelius |
| 7,000,122 B2 | 2/2006 | Zafarana et al. |
| 7,035,785 B2 | 4/2006 | Grochowski et al. |
| 7,071,723 B2 | 7/2006 | Krishnamoorthy et al. |
| 7,134,036 B1 | 11/2006 | Guan |
| 7,233,163 B2 | 6/2007 | Krishnamoorthy et al. |

(Continued)

OTHER PUBLICATIONS

USPTO Notice of allowance for U.S. Appl. No. 11/847,557 dated Dec. 31, 2009.

(Continued)

*Primary Examiner* — Hal D Wachsman
(74) *Attorney, Agent, or Firm* — Yee & Associates, P.C.; Matthew W. Baca

(57) ABSTRACT

A circuit for detecting noise events in a system with time variable operating points is provided. A first voltage, which is averaged over time, is compared to a second voltage. A signal is generated to instruct circuits within a processor to initiate actions to keep a voltage from drooping further.

9 Claims, 2 Drawing Sheets

U.S. PATENT DOCUMENTS

| | | | |
|---|---|---|---|
| 7,236,920 B2 | 6/2007 | Grochowski et al. | |
| 7,239,494 B2 | 7/2007 | Naffziger | |
| 7,339,411 B2 | 3/2008 | Yuuki et al. | |
| 7,467,050 B2 | 12/2008 | Douriet et al. | |
| 7,480,810 B2* | 1/2009 | Gonzalez et al. | 713/300 |
| 7,483,248 B1 | 1/2009 | Ho et al. | |
| 2004/0085085 A1* | 5/2004 | Muhtaroglu et al. | 324/765 |
| 2004/0123166 A1 | 6/2004 | Gauthier et al. | |
| 2005/0062507 A1 | 3/2005 | Naffziger et al. | |
| 2006/0132086 A1* | 6/2006 | Altenburg et al. | 320/106 |
| 2007/0006012 A1 | 1/2007 | Mosur et al. | |
| 2007/0283172 A1 | 12/2007 | Douriet et al. | |
| 2007/0296391 A1 | 12/2007 | Bertin et al. | |
| 2008/0007272 A1 | 1/2008 | Ferraiolo et al. | |
| 2008/0082887 A1 | 4/2008 | Dhong et al. | |
| 2009/0091378 A1 | 4/2009 | Haridass et al. | |

OTHER PUBLICATIONS

USPTO Notice of allowance for U.S. Appl. No. 11/869,186 dated Jun. 15, 2010.

USPTO Office Action dated Aug. 20, 2009 for U.S. Appl. No. 11/847,557.

* cited by examiner

METHOD FOR DETECTING NOISE EVENTS IN SYSTEMS WITH TIME VARIABLE OPERATING POINTS

This application is a continuation of application Ser. No. 11/420,825, now U.S. Pat. No. 7,467,050, filed May 30, 2006, status patented.

BACKGROUND OF THE INVENTION

1. Field of the Invention

The present invention relates generally to an apparatus and method for detecting noise in circuits. More specifically, the present invention provides a method and apparatus for detecting noise events in a system with time variable operating points.

2. Description of the Related Art

Power supply and power distribution system noise, especially dips due to large step activity increases in a microprocessor, are a limiting factor in how fast the circuits in such a processor can operate. This limits either the system operating frequency or limits chips that can yield at any given objective frequency. Traditionally, decoupling capacitors have been used to limit the magnitude of this noise. However, as design frequencies have risen over the years, decoupling capacitance is becoming either less effective at the frequencies that are required to have an effect, or are too costly in financial terms or power dissipation terms. That is, in terms of chip real estate and oxide leakage impact on chip power requirements.

Electrical distance from capacitor placement sites to circuits on chips constrained by physical space availability can make discrete capacitors completely or nearly ineffective. Therefore, it would be useful to have a mechanism for detecting noise events that indicate that further executions will cause the voltage in a circuit to dip to unacceptably low levels.

Current solutions may utilize a circuit with a precision direct current (DC) reference to determine if the noise being detected is of a sufficient magnitude to cause action to be taken. However, use of a fixed DC reference will not allow distinguishing between high frequency noise and other drift, set-point granularity, voltage drops due to current and power distribution resistance, and other low frequency and DC variances from the perfect reference. Drift is a low frequency fluctuation. Set-point granularity means that there are only finite discrete points that can be generated. Points between these finite points are off limits and cannot be generated. Therefore, it would be desirable to determine a way to address these issues in a cost effective manner by using the voltage being monitored as the reference.

SUMMARY OF THE INVENTION

Exemplary embodiments describe a system, circuit, and a method for detecting noise events in a system with time variable operating points. A first voltage is compared to a second voltage. A signal is generated to instruct circuits within a processor to initiate actions to keep a voltage from drooping below a threshold level.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
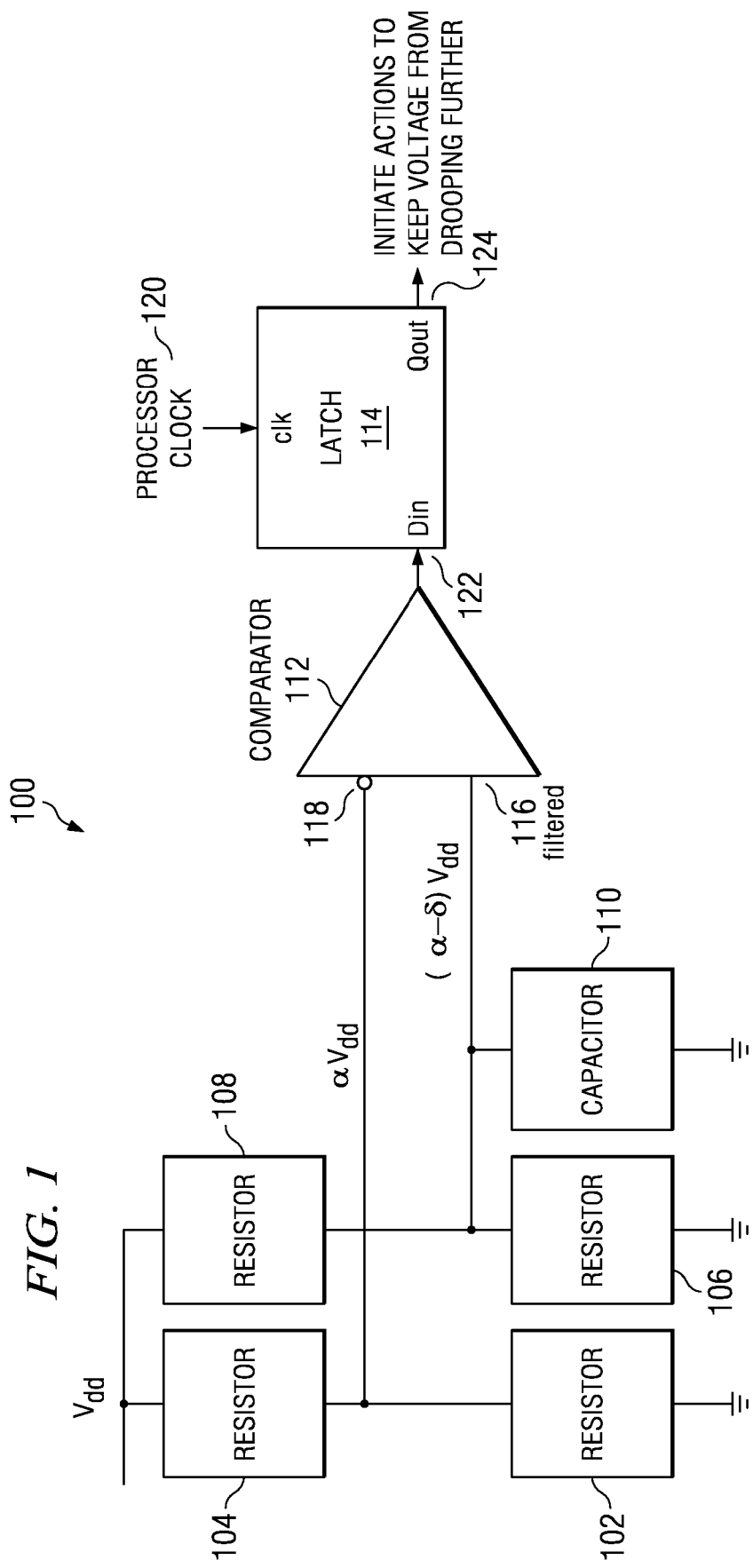
FIG. 1 is a circuit diagram for a sensing circuit, in accordance with an exemplary embodiment.

FIG. 1 is a circuit diagram for a sensing circuit, which could be used in a processor, for detecting noise events in a system with time variable operating points, in accordance with an exemplary embodiment. In the present example, "system" refers to a power supply power distribution. However, those skilled in the art will recognize that "system" may mean any set of circuits and subassemblies that could have an observable variable which could be represented by a signal voltage magnitude and might have undesired voltage noise on that signal. Time variable operating points are a characteristic of signals that the described sensing circuit would have value in monitoring, such that the monitored signal would have a nominally steady DC, or have drift perturbations to meet some system need. For instance, the described sensing circuit, sensing circuit 100, may be used to monitor a power supply in an instruction throttling application, where the power supply is allowed to fluctuate as the processor activity changes, or as temperature fluctuations cause leakage currents to vary, and so forth. It is undesirable to have a sensing circuit indicate that a noise droop is occurring due to one of these lower frequency fluctuations, because any performance throttling actions taken by the processor will be perceptible to the user. Whereas sensing circuit 100 will only identify droops that the processor could modify its activity without a noticeable impact on performance as perceived by the user. Droop is the difference between the nominal average operating or control point voltage and the instantaneous voltage at the circuit.

Sensing circuit 100 senses, or monitors, the circuit voltage and determines whether the instantaneous supply voltage has dipped significantly from the voltage average operating point. The circuit comprises resistors 102, 104, 106, and 108, capacitor 110, comparator 112, and latch 114. A comparator is a device which compares two voltages or currents, and switches its output to indicate which is larger. Resistors 102 and 104 comprise a resistor divider network that presents a first fraction of the Vdd voltage to inverting input 118 of comparator 112. Vdd stands for the voltage being monitored by the circuit. This first fraction is represented by the term α. α is representative of a value between 0 and 1. α is chosen to assure that the voltage presented to the inverting input of comparator 112 is within the operational range of comparator 112.

Resistors 106 and 108 comprise a second resistor divider network that presents a second fraction for the Vdd voltage to non-inverting input 116 of comparator 112. This voltage is filtered by capacitor 110 so that the voltage at non-inverting input 116 of comparator 112 is averaged over the time period determined by the values of resistors 106 and 108 and capacitor 110. The second fraction is slightly less than the first fraction. The second fraction is represented by the term (α−δ). δ is representative of a value between 0 and the value represented by first fraction α. δ divided by α represents the fraction of the average voltage on Vdd that should the noise droop below that average voltage on Vdd, known as the threshold level, then circuits within the processor would be at risk of malfunctioning. Latch 114 is comprised of Din 122, where the comparator inputs to the latch, and Qout 124, which digitally signifies power supply voltage has dipped to unacceptable levels and processor clock 120. The unfiltered Vdd containing noise, αVdd, is compared to the filtered Vdd, (α−δ)Vdd, by comparator 112. If αVdd is lower than (α−δ) Vdd, then comparator 112 sends a signal to latch 114, and latch 114 sends the message to other circuits in the processor to initiate actions to keep the voltage from drooping below a threshold level. Therefore, since circuit 100 identifies noise droops that are a fraction of a time average of that same voltage, circuit 100 can function correctly as the voltage operating point varies with time. Choice of the averaging period of the filtered Vdd voltage determines the lower frequency content of the drift and other DC or low frequency variances of that voltage's operating point.

In an exemplary embodiment, latch 114 sends the signal to other circuits in the processor to initiate actions to keep the voltage from drooping below a threshold level if the second voltage, the filtered Vdd, is lower than the first voltage, the unfiltered Vdd, by a specified criteria. In another exemplary embodiment, latch 114 sends the signal to other circuits in the processor to initiate actions to keep the voltage from drooping below a threshold level if the second voltage is higher than the first voltage by a specified criteria. The specific criteria will vary with the particular implementation. However, some examples of specific criteria may be if the voltage is higher or lower than a specific amount, or range, or if the voltage exceeds a certain range. Another example would be if the second voltage is either higher or lower than the first voltage by a specific percentage of the first voltage. While the example describes the first voltage as the unfiltered voltage and the second voltage as a filtered voltage, this denotation is not important in terms of the functioning of exemplary embodiments and denoting a first voltage as a filtered voltage and the second voltage as an unfiltered voltage as it will not effect the functioning of exemplary embodiments.

Those skilled in the art may recognize that the sensing circuit functions described above may be accomplished via other means such as sampling and holds, comparator chains, etc. The description above has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Another exemplary embodiment of the present invention provides for sensing the Vdd voltage with sample and hold circuitry such that the samples are taken at the same point in the processor clock cycle period so that high frequency ripple may be filtered out at frequency.

Figure 2:
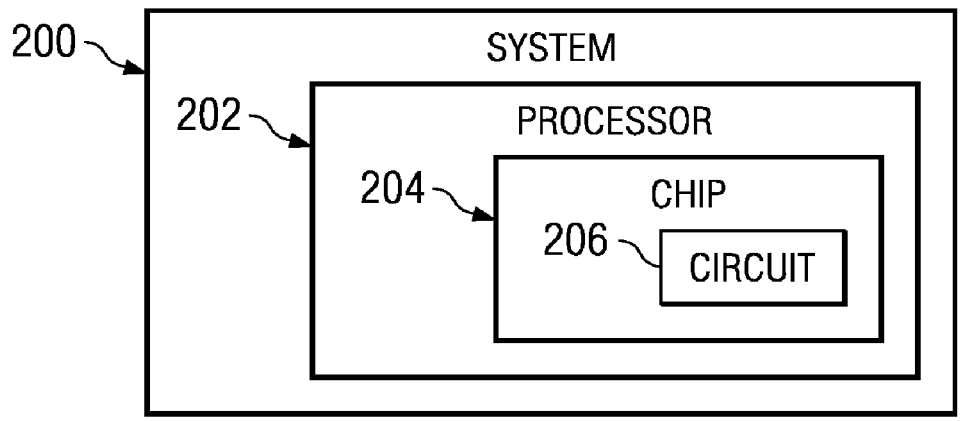
FIG. 2 is a block diagram illustrating components of a system for detecting noise events in a system with time variable operating points, in accordance with an exemplary embodiment.

FIG. 2 is a block diagram illustrating the components of a system for detecting noise events in a system with time variable operating points, in accordance with an exemplary embodiment. System 200 is a set of circuits and subassemblies that could have an observable variable which could be represented by a signal voltage magnitude and might have undesired voltage noise on that signal. Processor 202 is an example of a subassembly of the plurality of subassemblies that comprise system 200. Processor 202 is comprised of chip 204 and other components. Chip 204 is comprised of circuit 206 and other circuits. Circuit 206 may be implemented as sensing circuit 100 in FIG. 1. Circuit 206 monitors a voltage in system 200 to detect noise events. Circuit 206 measures the voltage and sets the voltage monitored as a beginning point. Circuit 206 then checks the voltage periodically for changes, referred to as noise, over time. Changes are detected by comparing the difference between the currently monitored voltages as compared to the initial starting point for the voltage. If the change is greater than a certain criteria, which is determined based on the particular implementation, circuit 206 generates a signal to other circuits in the processor to initiate actions to keep the voltage from drooping below a threshold level.

It is important to note that while in the above described example, the sensing circuit, circuit 206, has been described as part of processor 202, circuit 206 could be implemented anywhere within system 200. The above described example is not meant in anyway to limit exemplary embodiments to the described architecture.

Figure 3:
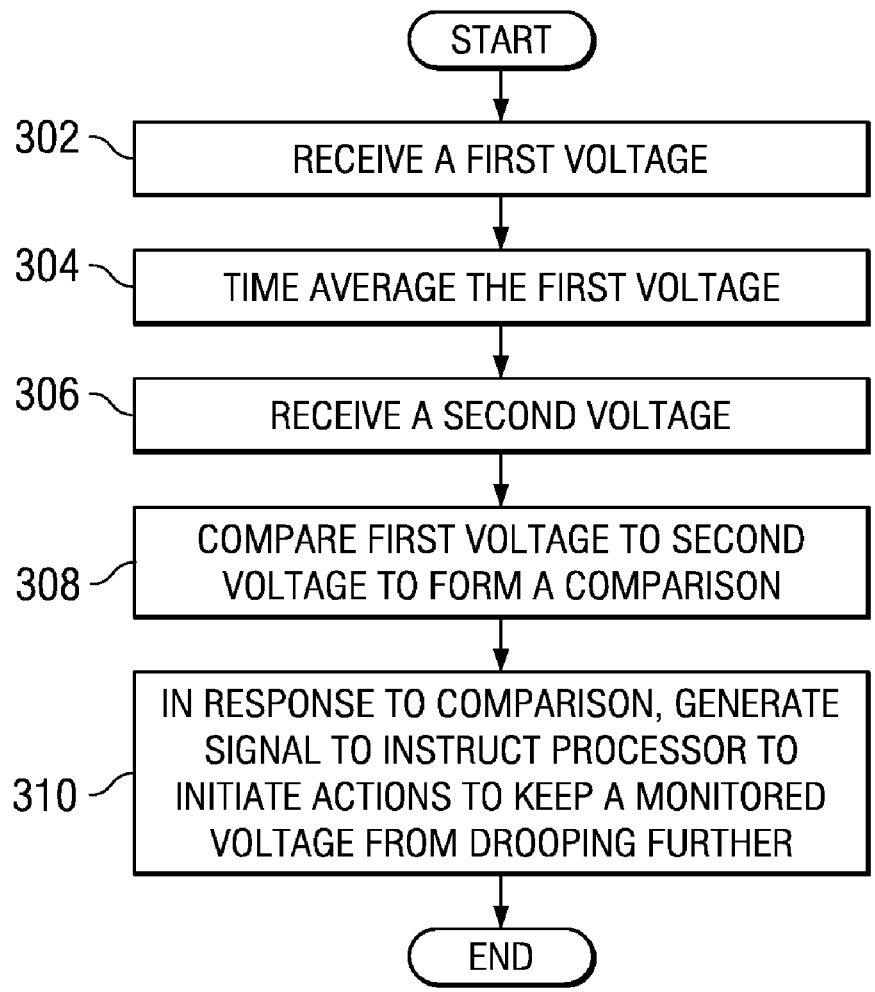
FIG. 3 is a flowchart illustrating an operation for detecting noise events in a system with time variable operating points, in accordance with an exemplary embodiment.

FIG. 3 is a flowchart illustrating an operation for detecting noise events in a system with time variable operating points, in accordance with an exemplary embodiment. The operation is performed by a circuit such as circuit 206 in FIG. 2 or sensing circuit 100 in FIG. 1. The operation begins when a first voltage is received (step 302). The first voltage is time averaged (step 304). The operation receives a second voltage (step 306). The time averaged first voltage is compared to the second voltage to form a comparison (step 308). In response to the comparison, a signal is generated to instruct the processor to initiate actions to keep a monitored voltage from drooping below a threshold level (step 310) and the operation ends.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A circuit for detecting a noise event in a system with time variable operating points, said circuit comprising:
   a comparing unit for comparing a first voltage to a second voltage to form a comparison, wherein the comparison identifies the noise event, wherein the first voltage is a first fractional portion of a selected voltage to be monitored, and wherein the second voltage is a second fractional portion of the monitored voltage and defines a threshold for a time variable operating point; and a signaling unit for generating a signal to instruct circuits in a processor to initiate actions to keep the monitored voltage from drooping below the threshold in response to the comparison meeting a specified criteria, wherein the specified criteria comprises the noise event being a set fraction of the time variable operating point.

2. The circuit of claim 1, wherein the first voltage represents an average of a set of voltage measurements.

3. The circuit of claim 2, wherein the average is an average over a specific time duration.

4. The circuit of claim 3, wherein the second voltage represents an average over a specific time duration that is shorter than the specific time duration of the first voltage.

5. The circuit of claim 1, wherein the second voltage represents an instantaneous voltage.

6. The circuit of claim 1, wherein the specified criteria comprises the second voltage being lower than the first voltage by a first specific amount.

7. The circuit of claim 6, wherein the specified criteria comprises the second voltage being higher than the first voltage by a second specific amount.

8. The circuit of claim 1, further comprising:
wherein the comparing unit for comparing a first voltage to second voltage is a comparator, wherein the comparator has an inverting input and a non-inverting input;
a first resistor divider network, the first resistor divider network comprising two resistors, wherein the first resistor divider network presents the first voltage to the circuit to the inverting input of the comparator;
a capacitor;
a second resistor divider network, the second resistor divider network comprising two resistors, wherein the second resistor divider network presents the second voltage, filtered by the capacitor, to the non-inverting input of the comparator; and
wherein the signaling unit for generating a signal to instruct the processor to initiate actions to keep the monitored voltage from drooping further is a latch, the latch comprising an input for receiving input from the comparator, a processor clock input, and an output, wherein the output sends a signal to instruct the processor to initiate actions to keep the monitored voltage from drooping below the threshold, based upon the input from the comparator.

9. The circuit of claim 1, wherein the system comprises a set of circuits and subassemblies that have an observable variable represented by a magnitude of signal voltage and have undesired voltage noise on the signal voltage.

* * * * *